United States Patent [19]
Diamond

[11] 4,096,743
[45] Jun. 27, 1978

[54] SHAFT TORQUE MEASURING SYSTEM

[75] Inventor: Joseph M. Diamond, Brooklyn, N.Y.

[73] Assignee: McNab, Incorporated, Mount Vernon, N.Y.

[21] Appl. No.: 740,558

[22] Filed: Nov. 10, 1976

[51] Int. Cl.² .............................................. G01L 3/10
[52] U.S. Cl. ................................................. 73/136 A
[58] Field of Search ................. 73/136 A; 330/149; 333/80 R; 328/167

[56] References Cited

U.S. PATENT DOCUMENTS

| 3,550,013 | 12/1970 | Gurol | 330/149 X |
| 3,824,845 | 7/1974 | Huebner | 73/136 A X |

Primary Examiner—Charles A. Ruehl
Attorney, Agent, or Firm—Peck & Peck

[57] ABSTRACT

An electrical circuit for shaft torque measuring systems of the type having a transducer producing an electrical signal representing shaft torque and a brush and slip ring assembly providing an output connection for the electrical shaft torque signal includes an operational amplifier having the electrical shaft torque signal connected across an inverting input terminal and an output terminal with a capacitor providing negative feedback between the inverting input and output terminal and a resistor connected in series with the inverting input terminal to form with the capacitor a low pass filter such that resistance variations and circuit interruptions in the electrical shaft torque signal producing circuit do not adversely effect the output signal.

6 Claims, 2 Drawing Figures

U.S. Patent  June 27, 1978  4,096,743
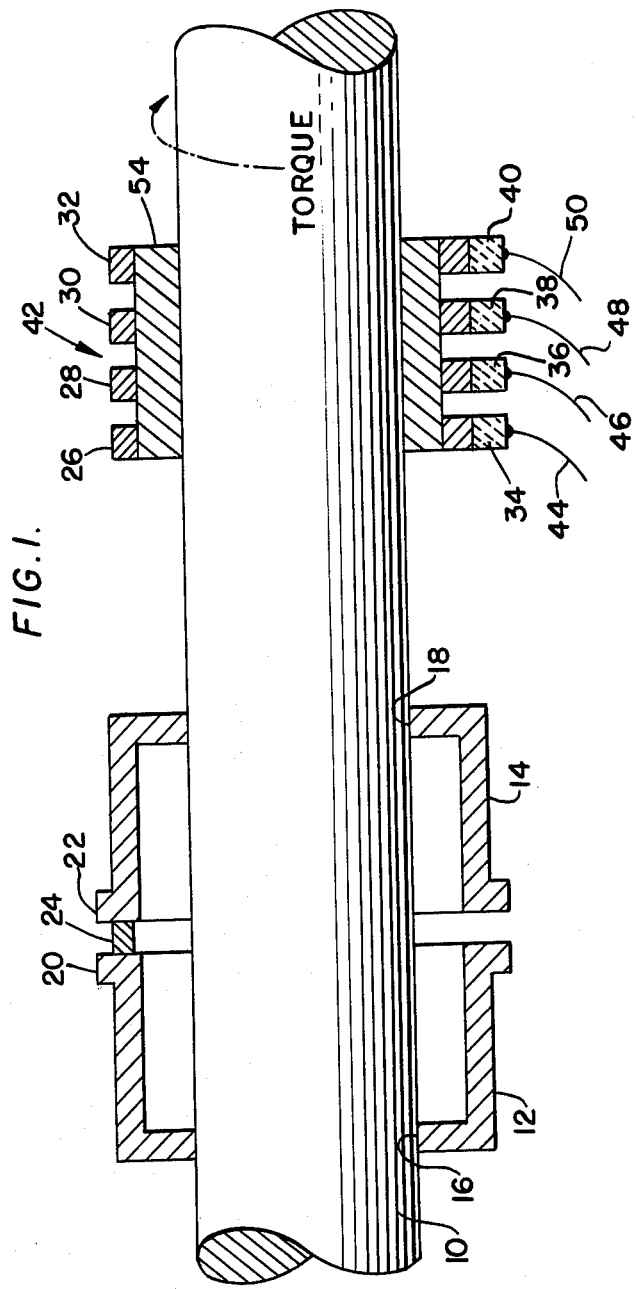
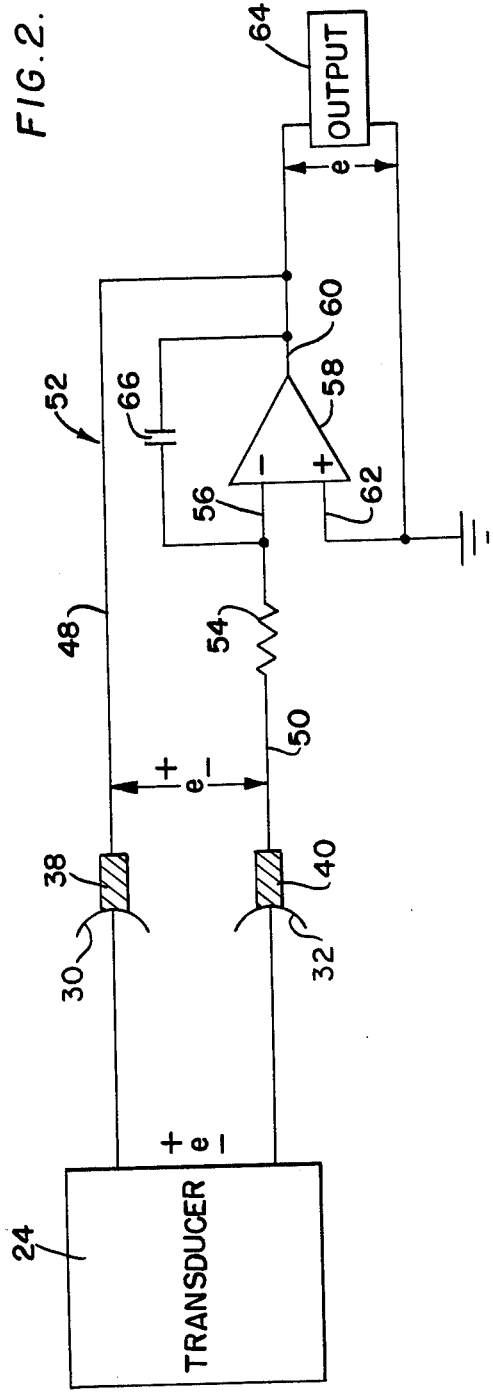

SHAFT TORQUE MEASURING SYSTEM

BACKGROUND OF THE INVENTION

1. Field of the Invention

The present invention pertains to the measurement of shaft torque and, more particularly, to a circuit for enhancing electrical signals representative of shaft torque.

2. Discussion of the Prior Art

The torque applied to a shaft is a condition which frequently requires measurement for many purposes. Among these is the use of shaft torque to determine related quantity horsepower which is a matter of wide practical importance. An example is the measurement of driving torque in the shafts of ships.

Shaft torque is commonly measured by determining the amount of twist in the shaft as a result of the torque exerted on the shaft. Conventionally, the twist is measured by means of a transducer attached to axially spaced portions of the shaft such that twisting stress on the transducer produces an electrical signal representative of shaft torque. In order to supply electrical power to the transducer and any electrical circuits mounted on the shaft, slip ring and brush assemblies are utilized on the rotating shaft and, similarly, slip ring and brush assemblies on the rotating shaft are utilized to transmit the electrical shaft torque signal produced by the transformer to external stationary circuits of the shaft torque measuring system.

While shaft torque measuring systems utilizing such slip ring and brush assemblies are commonly used, they suffer from the disadvantages that the electrical contact between the brushes and the rings can deviate from an ideal connection both due to variations in electrical resistance introduced into the circuits and due to momentary interruptions of the circuits caused by slight chattering of the brushes.

SUMMARY OF THE INVENTION

Accordingly, it is a primary object of the present invention to overcome the above mentioned disadvantages of conventional shaft torque measuring systems.

More particularly, it is an object of the present invention to utilize an operational amplifier to receive electrical shaft torque transducer signals in a manner such that deviations in electrical contact between the brushes and rings do not materially affect the output signal.

Another object of the present invention is to connect an electrical shaft torque signal to the inverting input of an operational amplifier and provide negative feedback such that the operational amplifier will stabilize itself.

The present invention has an additional object in the use of an operational amplifier to receive electrical shaft torque signals such that interruptions of the signal due to momentary chattering of the brushes merely cause the circuit voltage to float at the pre-interruption value which is stored in a feedback capacitor.

A further object of the present invention is to connect electrical shaft torque signals from a transducer across the inverting input terminal and the output terminals of an operational amplifier while coupling output means between the other input terminal and the output terminal of the operational amplifier, a capacitor being connected in a feedback path between the output and inverting input terminals and a resistor being connected in series with the inverting input terminal such that the resistor and capacitor function as a low pass filter to smooth any ripples in the electrical shaft torque signal.

The present invention is generally characterized in an improvement in a shaft torque measuring system of the type having a transducer producing an electrical signal representing shaft torque and a brush and slip ring assembly providing an output connection for the electrical shaft torque signal, the improvement comprising an operational amplifier including an inverting input terminal and an output terminal; input means for coupling the electrical shaft torque signal from the brush and slip ring assembly to the operational amplifier between the inverting input terminal and the output terminal; and output means coupled to the output terminal of the operational amplifier whereby resistance variations or circuit interruptions in the brush and slip ring means do not adversely affect said shaft torque output signal.

Some of the advantages of the present invention over the prior art are that by use of a simple and relatively inexpensive operational amplifier circuit, deviations in electrical contact between the brushes and rings of a shaft torque measuring system are prevented from adversely affecting the output signal representing shaft torque.

Other objects and advantages of the present invention will become apparent from the following description of the preferred embodiment taken in conjunction with the accompanying drawings.

BRIEF DESCRIPTION OF THE DRAWINGS

FIG. 1 is a sectional view of a conventional shaft torque measuring system.

FIG. 2 is a schematic diagram of the circuit of the present invention for improving the output from the shaft torque measuring system of FIG. 1.

DESCRIPTION OF THE PREFERRED EMBODIMENT

A conventional shaft torque measuring system is shown in FIG. 1 for measuring the torque applied to a shaft 10, the system including a pair of cylindrical shell structures 12 and 14 secured to the shaft at axially spaced positions 16 and 18, respectively. The shells 12 and 14 have mounted between their respective internal edges 20 and 22 a displacement transducer 24 of the type adapted to produce an electrical signal in accordance with movement imposed thereon by the relative motion of the shell structures 12 and 14 caused by the slight twist in the shaft 10 responsive to torque applied thereto. Any conventional displacement transducer producing a displacement related electrical signal can be utilized.

Four slip rings 26, 28, 30 and 32 and contacting brushes 34, 36, 38 and 40 form a brush and slip ring assembly 42 to permit electrical connections to the rotating shaft 10. Leads 44 and 46 are connected with brushes 34 and 36, respectively, to supply electrical power to operate displacement transducer 24 and any other electrical circuits mounted on the shaft while leads 48 and 50 transmit the electrical shaft torque signal produced by the displacement transducer 24 corresponding to the small relative movement between the edges 20 and 22 of the shell structures 12 and 14 to the circuit 52 of FIG. 2. The rings 26, 28, 30 and 32 are secured to an insulating mounting 54 carried by the shaft 10.

The circuit 52 constituting the shaft torque measuring system improvement of the present invention is shown in FIG. 2 wherein the output of displacement transducer 24 is indicated as "e" with one terminal being connected through ring 32, brush 40 and lead 50 through a resistor 54 to the inverting input terminal 56 of an operational amplifier 58. The other output of transducer 24 is connected with an output terminal 60 of operational amplifier 58 through ring 30, brush 38 and lead 48 such that the electrical shaft torque signal from the transducer 24 is coupled across the inverting and output terminals of the operational amplifier. The other (non-inverting) input 62 of the operational amplifier is coupled to a reference potential such as ground, and an output representative of shaft torque is produced between ground and output terminal 60 of the operational amplifier for supply to any suitable electrical circuitry indicated broadly at 64. A capacitor 66 is connected between output terminal 60 and inverting input terminal 56 to smooth out any signal ripple.

Since the electrical shaft torque signal is applied to the inverting input terminal 56 of the operational amplifier, the feedback is negative, and the amplifier will therefore stabilize itself such that the voltage at inverting input terminal 56 will be the same as the voltage at input terminal 62, namely zero. Resistor 54 and capacitor 66 function as a low pass filter to smooth out any signal ripple. The output voltage taken between output terminal 60 and ground will therefore be equal to the transducer output "e" as shown. The resistance of the torque signal loop including the resistance of the brushes is inconsequential since the electrical shaft torque signal voltage "e" is balanced by the voltage between output terminal 60 and input terminal 56 produced by the operational amplifier. That is, the current is essentially zero so that variations in the resistance of the signal loop including the brush and slip ring assembly cause no voltage drop.

Complete interruptions of the electrical shaft torque signal circuit due to momentary chattering of the brushes will merely cause the circuit voltage to float at the pre-interruption value which is stored in the capacitor 66. Under these conditions, the only drift in the floating voltage will be caused by the slight input current at the inverting input terminal of the operational amplifier. With a proper choice of amplifier, this drift is extremely slow, particularly when compared with the short interruptions of the circuit due to brush chattering. The result is that neither resistance variations nor actual interruptions of the measuring circuit have any adverse effect on the torque reading obtained at output 64.

The voltage at the output can be adjusted for display by any suitable electrical indicating means, such as digital meters. In this manner, a direct readout of shaft torque in whatever units may be desired (such as inch-pounds, foot-pounds, foot-tons, etc.) can be obtained. Of course, if desired, horsepower, which is proportional to the product of shaft torque and shaft speed can be obtained by performing the required calculation with either digital or analog techniques.

Examples of components used in the circuit 52 are as follows:

resistor 54 – 5.6 Megohms
capacitor 66 – 1.5 microfarads
operational amplifier 58 — LF355H (National Semiconductor)

Inasmuch as the present invention is subject to many variations, modifications and changes in detail, it is intended that all subject matter described above or shown in the accompanying drawings be interpreted as illustrative and not in a limiting sense.

What is claimed is:

1. In a shaft torque measuring system of the type having transducer means producing an electrical signal representing shaft torque and brush and slip ring means providing an output connection for the electrical shaft torque signal, the improvement comprising
   operational amplifier means including an inverting input terminal and an output terminal;
   input means for coupling the electrical shaft torque signal from the output connection of the brush and slip ring means to said operational amplifier means between said inverting input terminal and said output terminal; and
   output means coupled to said output terminal of said operational amplifier means providing an output signal representative of shaft torque whereby resistance variations or circuit interruptions in the brush and slip ring means do not adversely affect said shaft torque output signal.

2. The improvement as recited in claim 1 wherein said operational amplifier means includes circuit means coupled between said inverting input terminal and said output terminal to provide negative feedback.

3. The improvement as recited in claim 2 wherein said circuit means includes capacitance means.

4. The improvement as recited in claim 3 wherein resistance means is connected in series with said inverting input terminal and the brush and slip ring means to form with said capacitance means a low pass filter.

5. The improvement as recited in claim 4 wherein said operational amplifier means has a second input terminal coupled to a reference voltage and said output means is coupled between said output terminal and said second input terminal.

6. The improvement as recited in claim 1 wherein said operational amplifier means includes a resistor connected in series between said inverting input terminal and the brush and slip ring means, a capacitor connected between said output terminal and said inverting input terminal to provide negative feedback and a second input terminal connected to ground.

* * * * *